United States Patent
Hassler et al.

(10) Patent No.: US 11,213,795 B2
(45) Date of Patent: Jan. 4, 2022

(54) CORROSION-PROTECTED REFORMER TUBE WITH INTERNAL HEAT EXCHANGE

(71) Applicant: L'Air Liquide, Societe Anonyme pour l'Etude et l'Exploitation des Procedes Georges Claude, Paris (FR)

(72) Inventors: Nathanael Hassler, Neu-Anspach (DE); Antonio Coscia, Hadamar (DE)

(73) Assignee: L'Air Liquide Societe Anonyme Pour L'Etude Et L'Exploitation Des Procedes Georqes Claude, Paris (FR)

( * ) Notice: Subject to any disclaimer, the term of this patent is extended or adjusted under 35 U.S.C. 154(b) by 377 days.

(21) Appl. No.: 16/315,407

(22) PCT Filed: Jun. 27, 2017

(86) PCT No.: PCT/EP2017/025180
§ 371 (c)(1),
(2) Date: Jan. 4, 2019

(87) PCT Pub. No.: WO2018/007021
PCT Pub. Date: Jan. 11, 2018

(65) Prior Publication Data
US 2019/0308154 A1  Oct. 10, 2019

(30) Foreign Application Priority Data
Jul. 7, 2016 (EP) .................................... 16400025

(51) Int. Cl.
*B01J 8/06* (2006.01)
*B01J 8/02* (2006.01)
(Continued)

(52) U.S. Cl.
CPC .............. *B01J 8/065* (2013.01); *B01J 8/008* (2013.01); *B01J 8/0257* (2013.01); *B01J 8/062* (2013.01);
(Continued)

(58) Field of Classification Search
CPC ....................................................... B01J 8/065
(Continued)

(56) References Cited

U.S. PATENT DOCUMENTS

| 3,442,618 A | 5/1969 | Sederquist |
| 2004/0172877 A1* | 9/2004 | Wunning ................ C01B 3/323 48/102 A |
| 2015/0076410 A1* | 3/2015 | Schlichting ............. C01B 3/388 252/373 |

FOREIGN PATENT DOCUMENTS

| DE | 38 06 536 | 9/1988 |
| WO | WO 2013/068416 | 5/2013 |

OTHER PUBLICATIONS

Aguero, A., et al., "Metal Dusting Protective Coatings. A Literature Review," Oxidation of Metals, Kluwer Academic Publishers—Plenum Publishers, NE, vol. 76, No. 1-2, Mar. 20, 2011, pp. 23-42.
(Continued)

*Primary Examiner* — Douglas B Call
(74) *Attorney, Agent, or Firm* — Justin K. Murray

(57) ABSTRACT

A reformer tube for producing synthesis gas by steam reforming of hydrocarbon-containing input gases is proposed where an outer shell tube is divided by means of a separating tray into a reaction chamber and an exit chamber, a dumped bed of a steam-reforming-active solid catalyst is arranged in the reaction chamber, at least one heat exchanger tube is arranged inside the reaction chamber and inside the dumped catalyst bed, whose entry end is in fluid connection with the dumped catalyst bed and whose exit end is in fluid connection with the exit chamber, the exit end of the heat exchanger tube is fed through the separating tray and opens out into a corrosion-protected inner tube which is disposed in the interior of the shell (Continued)

tube and is in fluid connection with a collection conduit for the synthesis gas product, and a gas-permeable thermal insulation layer is arranged between the inner wall of the shell tube and the outer wall of the inner tube.

9 Claims, 1 Drawing Sheet

(51) Int. Cl.
B01J 19/02 (2006.01)
C01B 3/38 (2006.01)
B01J 8/00 (2006.01)

(52) U.S. Cl.
CPC ............... *B01J 8/067* (2013.01); *B01J 19/02* (2013.01); *C01B 3/384* (2013.01); *B01J 2208/0053* (2013.01); *B01J 2208/00132* (2013.01); *B01J 2208/00141* (2013.01); *B01J 2208/00495* (2013.01); *B01J 2208/00504* (2013.01); *B01J 2208/00539* (2013.01); *B01J 2208/00991* (2013.01); *B01J 2208/065* (2013.01); *B01J 2219/024* (2013.01); *B01J 2219/0281* (2013.01); *B01J 2219/0286* (2013.01); *C01B 2203/0233* (2013.01); *C01B 2203/0816* (2013.01); *C01B 2203/0833* (2013.01); *C01B 2203/0883* (2013.01); *C01B 2203/1011* (2013.01); *C01B 2203/1058* (2013.01); *C01B 2203/1241* (2013.01); *C01B 2203/141* (2013.01)

(58) Field of Classification Search
USPC ........................................................ 252/373
See application file for complete search history.

(56) References Cited

OTHER PUBLICATIONS

International Search Report and Written Opinion for PCT/EP2017/025180, dated Oct. 30, 2017.

Higman, C ED—Brendeng E., et al., "Synthesis gas processes for synfuels production," EUROGAS '90 Proceedings, Tapir Publ, May 28, 1990, pp. 1-10.

* cited by examiner

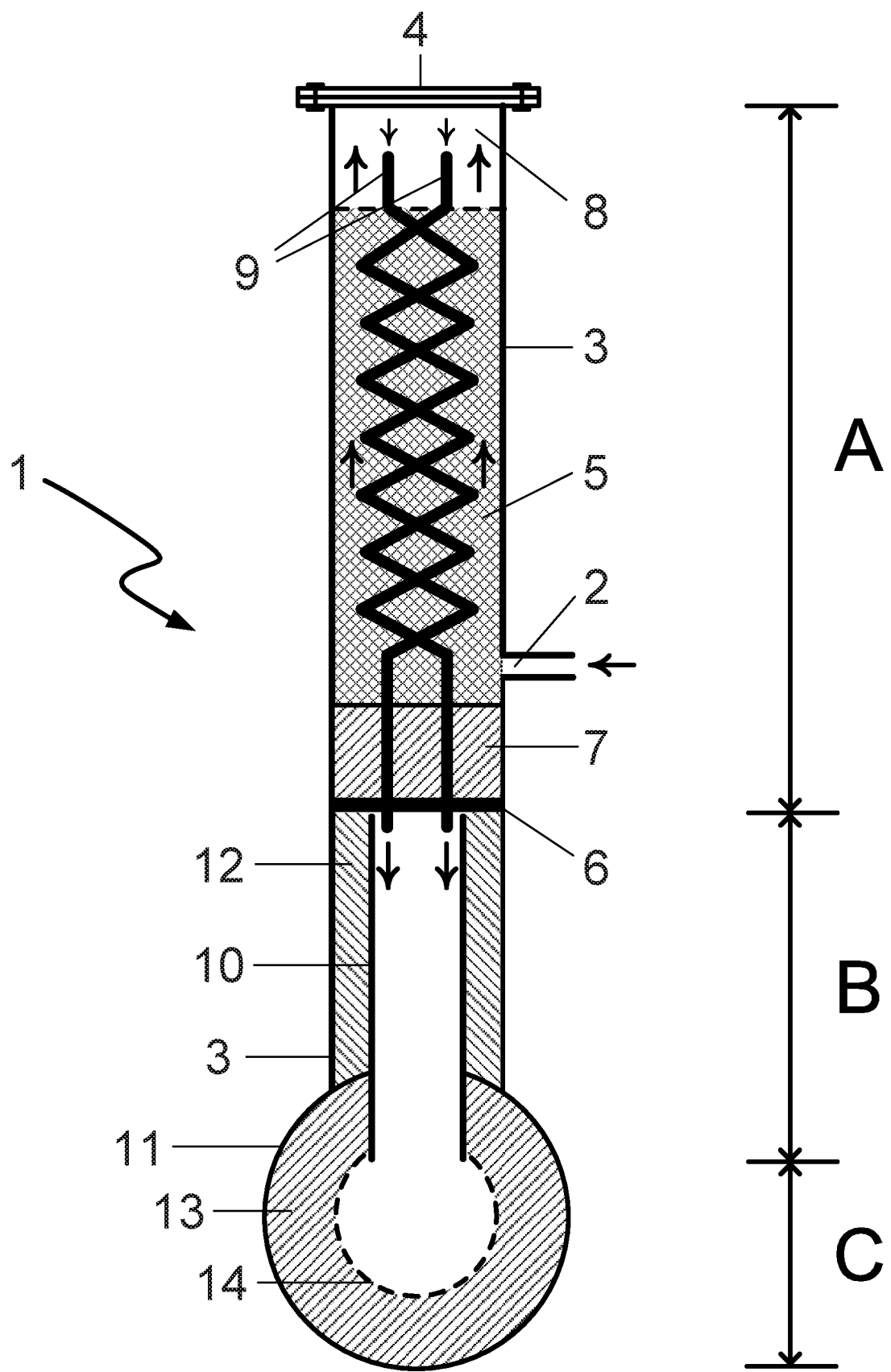

CORROSION-PROTECTED REFORMER TUBE WITH INTERNAL HEAT EXCHANGE

CROSS REFERENCE TO RELATED APPLICATIONS

This application is a § 371 of International PCT Application PCT/EP2017/025180, filed Jun. 27, 2017, which claims the benefit of EP16400025.9, filed Jul. 7, 2016, both of which are herein incorporated by reference in their entireties.

FIELD OF THE INVENTION

The invention relates to a reformer tube for converting hydrocarbon-containing input materials, preferably natural gas and light liquid hydrocarbons such as naphtha, into a synthesis gas product comprising carbon oxides and hydrogen. The reformer tube according to the invention enables internal heat exchange between the input gas and the product gas partially converted into synthesis gas products, thus giving rise to advantages in terms of energy consumption during production of synthesis gas and the products of value hydrogen and carbon monoxide. The invention further relates to a process for producing synthesis gas by steam reforming of hydrocarbon-containing input materials using the reformer tube according to the invention, and to a reformer furnace provided with the reformer tube.

BACKGROUND OF THE INVENTION

Hydrocarbons may be catalytically reacted with steam to afford synthesis gas, i.e. mixtures of hydrogen ($H_2$) and carbon monoxide (CO). As is explained in Ullmann's Encyclopedia of Industrial Chemistry, Sixth Edition, 1998 Electronic Release, keyword "Gas Production", this so-called steam reforming is the most commonly employed method of producing synthesis gas, which may then be converted into further important commodity chemicals such as methanol or ammonia. While different hydrocarbons, such as for example naphtha, liquid gas or refinery gases, may be converted, it is steam reforming of methane-containing natural gas that dominates.

Steam reforming of natural gas is highly endothermic. It is therefore performed in a reformer furnace in which numerous catalyst-containing reformer tubes in which the steam reforming reaction takes place are arranged in parallel. The outer walls of the reformer furnace and its ceiling and floor are faced or lined with a plurality of layers of refractory material which withstands temperatures of up to 1200° C. The reformer tubes are usually fired with burners which are mounted on the top or bottom or on the side walls of the reformer furnace and directly heat the interspace between the reformer tubes. Heat transfer to the reformer tubes is effected by heat radiation and convective heat transfer from the hot flue gases.

After pre-heating by heat exchangers or fired heaters to about 500° C., the hydrocarbon-steam mixture enters the reformer tubes after end-heating to about 500° C. to 800° C. and is therein converted into carbon monoxide and hydrogen over the reforming catalyst. Nickel-based reforming catalysts are widespread. While higher hydrocarbons are fully converted into carbon monoxide and hydrogen, in the case of methane partial conversion is typical. The composition of the product gas is determined by the reaction equilibrium; the product gas thus comprises not only carbon monoxide and hydrogen but also carbon dioxide, unconverted methane and water vapour. For energy optimization or for input materials comprising higher hydrocarbons, a so-called prereformer for precracking the input material may be employed downstream of the pre-heater. The pre-cracked input material is then heated to the desired reformer tube entry temperature in a further heater.

The hot synthesis-gas product gas is partially cooled in one or more heat exchangers after leaving the reformer furnace. The partially cooled synthesis-gas product gas then passes through further conditioning steps dependent on the type of the desired product or of the downstream process.

Steam reforming of natural gas is notable for its high energy requirements. The prior art therefore already contains proposals which aim to minimize external energy requirements through optimized process design, for example through energy recovery. For instance, Higman demonstrated a so-called HCT reformer tube with internal heat exchange at the EUROGAS-90 conference, Trondheim, June 1990, also disclosed at http://www.higman.de/gasification/papers/eurogas.pdf (Retrieved 27 Sep. 2011). This tube comprises an outer catalyst-filled and externally heated reformer tube where the input gas flows through the catalyst bed from top to bottom. Inside the catalyst bed are two coiled double-helix heat exchanger tubes, made of a suitable material, through which the partially reformed gas flows after leaving the catalyst bed, thus transferring a portion of its sensible heat to the steam reforming process taking place over the catalyst. However a disadvantage here is the higher pressure drop on account of the longer route of the gas through the coiled heat exchanger tubes. Furthermore, a type of corrosion elucidated hereinbelow and referred to as "metal dusting" becomes more markedly apparent since longer sections of the heat exchanger tubes are subject to the temperature range relevant for metal dusting corrosion.

As is taught in the paper "Metal Dusting Protective Coatings. A Literature Review", A. Agüero et al., Oxid Met (2011) 76:23-42, metal dusting is a type of corrosive disintegration of metals and alloys into fine particles. Materials susceptible to this form of corrosive attack include in particular iron, nickel, cobalt and alloys thereof. Metal dusting occurs at high temperatures of approximately 400 to 800° C. and in gas atmospheres comprising in particular carbon monoxide (CO) or hydrocarbons. In actual fact below 400° C. the thermodynamic potential for the metal dusting reaction is high but the reaction rate low. Above 800° C. the thermodynamic potential for metal dusting is so low that it does not occur to any appreciable extent. Metal dusting is therefore often observed in steam reforming processes affecting all plant parts, in particular equipment parts in the waste heat section, that come into contact with the generated synthesis gas in the recited temperature range.

At high temperatures CO and hydrocarbons have a propensity for dissociating on metal and thereby depositing carbon on the metal surface. The carbon is then converted into the solid phase and extracts the susceptible metals from their homogeneous solid matrix, thus resulting in pitting and finally in mechanical collapse of the materials. This results in high maintenance costs and can cause serious safety problems, for example through bursting of pressurized conduits and apparatuses and/or through escape of toxic carbon monoxide.

The incidence of metal dusting may be prevented or at least retarded by means of the following measures:
a) Altering the operating conditions of the basic process, especially temperature and pressure,
b) Deliberately poisoning the metal surfaces with sulphur compounds, for example, c) Altering the alloy composition and/or using corrosion-resistant materials, d) Modifying the surface properties by chemical, thermal or mechanical treatment, e) Applying a corrosion-inhibiting coating on the alloy surface.

Measures under a) often fail because the basic process under consideration requires these very temperatures and pressures. The same is true of measure c), since the process conditions of the basic process require a particular selection of materials and hence a particular alloy composition. Furthermore, the efficacy of the measures under b) and d) is often time-limited.

With regard to measure e), there are usually either diffusion coatings or coverings or outer layers employed that are based on the formation of a thin, stable, protective and adhering oxide scale layer, based on the elements aluminium, chromium or silicon. The most frequently employed in the chemical industry at present at high temperatures for protection from oxidation and corrosion are aluminium diffusion coatings.

Diffusion coatings are formed when an alloy is coated with a metal or metal mixture at a temperature high enough to enable diffusion of the metal or metals into the substrate. The result is a metallurgical bond with the substrate material, with the coating then becoming an integral part of the substrate material. Disadvantages arising here are the high production cost and complexity and the limited lifetime of diffusion coatings, as a result of volatilization of the protective metal or abrasion, for example.

Also affording protection from metal dusting corrosion is the fabrication of complete sections of plant, such as pipelines, for example, from ceramic materials. A disadvantage in that case, however, is the lower pressure resistance and/or, generally, the reduced formability and elasticity as compared with metallic materials.

SUMMARY OF THE INVENTION

It is accordingly an object of the present invention to specify a reformer tube having favourable properties in terms of energy recovery by internal heat exchange while at the same time having minimized susceptibility to metal dusting corrosion.

This object is achieved by a reformer tube having the features of certain embodiments disclosed herein. Further embodiments of the invention are apparent from the respective dependent claims.

Reformer Tube According to an Embodiment of the Invention:

Reformer tube for converting hydrocarbon-containing input materials, preferably natural gas, into a synthesis gas product comprising carbon oxides and hydrogen under steam reforming conditions, comprising (a) an outer, pressurized shell tube, wherein the shell tube is divided into a reaction chamber and an exit chamber by means of a separating tray, so that it is possible to set a different, preferably lower, pressure in the exit chamber than in the reaction chamber, and wherein the reaction chamber is externally heated, (b) a dumped bed of a steam-reforming-active solid catalyst arranged in the reaction chamber, (c) an entry for the input gas stream comprising the input material, arranged in the region of the reaction chamber, wherein the entry for the input gas stream is in fluid connection with the dumped catalyst bed, (d) at least one heat exchanger tube arranged inside the reaction chamber and inside the dumped catalyst bed, whose entry end is in fluid connection with the dumped catalyst bed and whose exit end is in fluid connection with the exit chamber, wherein the input gas stream after entry into the reaction chamber initially flows through the dumped catalyst bed and subsequently flows through the heat exchanger tube in countercurrent, and wherein the heat exchanger tube is in a heat exchange relationship with the dumped catalyst bed and the input gas stream flowing therethrough, (e) a collection conduit for the synthesis gas product, which is in fluid connection with the exit chamber, characterized in that, in the region of the exit chamber, (f) the exit end of the heat exchanger tube is fed through the separating tray and opens into an inner tube which is arranged in the interior of the shell tube and is in fluid connection with the collection conduit, so that the synthesis gas product is able to pass from the reaction chamber via the exit chamber into the collection conduit, (g) the inner tube is equipped with a corrosion protection layer or consists of a corrosion-resistant material, (h) a gas-permeable thermal insulation layer is disposed between the inner wall of the shell tube and the outer wall of the inner tube.

The invention also relates to a reformer furnace which is equipped with the reformer tube according to the invention, and also to a process for producing synthesis gas by catalytic steam reforming of hydrocarbon-containing input materials in the reformer tube according to the invention.

Fluid connection between two regions of the reformer tube is to be understood as meaning any type of connection whatsoever which makes it possible that a fluid, for example the input gas stream or the synthesis gas product stream, can flow from the one to the other of the two regions, neglecting any interposed regions or components.

Heat exchange relationship refers to the possibility of heat exchange or heat transfer between two regions of the reformer tube, wherein all mechanisms of heat exchange or heat transfer such as heat conduction, heat radiation or convective heat transport may come into effect.

Steam reforming conditions are to be understood as meaning the process conditions known per se to a person skilled in the art, in particular of temperature, pressure and residence time, as recited by way of example above and discussed in detail in the relevant literature, and under which at least partial conversion but preferably industrially relevant conversions of the reactants into synthesis gas products such as CO and hydrogen is effected.

The feature whereby the exit end of the heat exchanger tube opens out into the inner tube arranged in the interior of the shell tube should not be interpreted more narrowly to mean that the tube end of the heat exchanger tube must be introduced into the inner tube. Instead, heat exchanger tube and inner tube may also be at a slight distance apart. What is essential is that the gas flow emerging from the heat exchanger tube flows substantially completely into the inner tube and therefore opens out into that tube.

The invention is based on the finding that the metal dusting corrosion, particularly of the pressurized shell tube, can be avoided or at least significantly reduced if, when the hot synthesis-gas product is guided out of the reaction chamber, with a temperature within the temperature range relevant for metal dusting corrosion, it is passed through an unpressurized inner tube which is equipped with a corrosion protection layer or consists of a corrosion-resistant material. Therefore only a small portion of the reformer tube has to be protected—at cost and inconvenience—against metal dusting corrosion, and this portion, moreover, can be replaced relatively easily. Replacing the shell tube, in contrast, would be far more costly and inconvenient.

Equipping the exit chamber with an unpressurized, corrosion-protected inner tube interacts advantageously with the arrangement of a gas-permeable thermal insulation layer between the inner wall of the pressurized shell tube and the outer wall of the inner tube. The effect of the gas-permeable insulation layer is to allow the static pressure in the exit chamber to be transferred to the shell tube, which, however, is protected from metal dusting corrosion, since the thermal insulation layer means that the surface temperature of the inner wall of the shell tube is below the temperature range relevant for metal dusting corrosion, and so contact between the inner wall of the shell tube and the synthesis gas product is not critical.

Furthermore, the corrosion-resistant inner tube protects the gas-permeable thermal insulation layer, disposed between the inner wall of the shell tube and the outer wall of the inner tube, from erosion or abrasion by the high gas velocities which come about in the exit chamber. Since, by virtue of the desired gas permeability, the insulation layer has a fairly loose nature or packing density and, in association therewith, a low mechanical stability, an additional protective function of this kind is important.

PREFERRED EMBODIMENTS OF THE INVENTION

It is preferable when, in the reformer tube according to the invention, the exit end of the heat exchanger tube is equipped on its inside, and the portion fed through the separating tray on its outside as well, with a corrosion protection layer. In this way, not only the exit chamber but also the portion of the heat exchanger tube which is in the critical temperature range is protected from metal dusting corrosion.

It is preferred, furthermore, for the inner tube to be seated on the separating tray, but not to be in gastight connection therewith. In this way, pressure compensation and/or pressure transfer can take place through the gas-permeable thermal insulation layer onto the inner wall of the shell tube. Contact of the inner wall of the shell tube with the synthesis gas product is not critical, since the surface temperature of said wall, owing to the insulation, is below the temperature range relevant for metal dusting corrosion. Since, therefore, the inner tube is unpressurized, it may also be produced from less pressure-resistant materials, such as ceramic materials for example.

With particular preference the reformer tube of the invention is equipped with a helically coiled heat exchanger tube and there are preferably two heat exchanger tubes present, arranged in the form of a double helix in the dumped catalyst bed. This embodiment of the reformer tube represents a favourable compromise between cost and complexity of apparatus and favourable heat transfer properties.

In one advantageous embodiment of the reformer tube according to the invention, the internal diameter of the at least one heat exchanger tube is selected such that, based on the normal value of the input gas stream, a target pressure is brought about in the exit chamber that is smaller than the pressure in the reaction chamber. In this way, the potential for metal dusting corrosion is reduced further, since its equilibrium position and reaction rate are influenced by the CO partial pressure and therefore—given a particular CO content in the synthesis gas product—by the overall pressure. In this way, furthermore, the pressure desired in the collection conduit is established.

The invention also comprehends a reformer furnace comprising refractorily lined or refractorily faced walls, a ceiling and a floor and an interior formed thereby, wherein at least one reformer tube according to certain embodiments disclosed herein and at least one burner for heating the reformer tube are arranged in the interior or in a secondary space in fluid connection with the interior in respect of the burner flue gases.

In a particular embodiment of the reformer furnace according to the invention, the at least one reformer tube is arranged in the interior in free-hanging or free-standing fashion, wherein the portion of the shell tube comprising the reaction chamber is arranged in the interior and the portion of the shell tube comprising the exit chamber is at least partially fed through the ceiling or the floor. In free-hanging or free-standing fashion is to be understood as meaning in this connection that only the end of the reformer tube comprising the exit chamber is in mechanical contact with the ceiling or the floor of the reformer furnace.

This is particularly favourable since in this way thermomechanical stresses between the entry for the input gas stream and the exit for the synthesis gas product stream which arise on account of the considerable temperature differences in the reformer tubes known from the prior art are avoided. In the case of the latter, costly and complex measures, for example the use of stress compensators (so-called pigtails) or of cables, are therefore employed to compensate the stresses occurring and their negative effects, for example deformation of the reformer tube. This is no longer necessary for the free-hanging or free-standing arrangement of the reformer tube.

In a further preferred embodiment of the reformer furnace according to the invention, a multiplicity of reformer tubes and burners are arranged in the interior such that the longitudinal axes of the flames generated by the burners are oriented parallel to the longitudinal axes of the reformer tubes. This makes it possible to ensure that a burner achieves uniform heating of the reformer tubes arranged around it. Furthermore the parallel flame axes supply radiated heat to the reformer tubes over a longer distance and local overheating of the outsides of the reformer tubes is avoided.

The invention also comprehends a process for producing synthesis gas by catalytic steam reforming of hydrocarbon-containing input materials, preferably natural gas, under steam reforming conditions in the presence of a steam-reforming-active, solid catalyst, comprising the steps of:

(a) Provision of an input gas stream comprising the input material and addition of reforming steam, (b) Catalytic conversion of the input material under steam reforming conditions into a synthesis gas product comprising carbon oxides and hydrogen, (c) Discharging and optional workup of the synthesis gas product, wherein the catalytic conversion in step (b) is effected in a reformer tube according to certain embodiments described herein.

In a particular embodiment of the process according to the invention, the pressure in the exit chamber is lower than in the reaction chamber and, based on the normal value of the input gas stream, this pressure corresponds to a target pressure specified beforehand. In this way, the potential for metal dusting corrosion is reduced further, since its equilibrium position and reaction rate are influenced by the CO partial pressure and therefore—given a particular CO content in the synthesis gas product—by the overall pressure. In this way, furthermore, the pressure desired in the collection conduit is established.

BRIEF DESCRIPTION OF THE DRAWINGS

Developments, advantages and possible applications of the invention are apparent from the following description of exemplary embodiments and the drawing. All described and/or depicted features on their own or in any desired combination form the subject matter of the invention, irrespective of the way in which they are combined in the claims and the way in which said claims refer back to one another.

The FIGURE shows a reformer tube according to a preferred embodiment of the invention.

DETAILED DESCRIPTION OF THE INVENTION

The reformer tube 1 according to the invention depicted in The FIGURE is divided into the sections A (reaction chamber), B (exit chamber) and C (collection conduit).

Via entry conduit 2, desulphurized natural gas together with reforming steam enters the reaction chamber A arranged in the upper portion of the shell tube 3. The shell tube consists of a nickel-chromium steel, for example of the type G-X45NiCrNbTi3525. The entry temperature of the input gas is 600° C., the space velocity based on the catalyst volume is typically 4000 to 5000 $m_N^3/(m^3h)$.

In the present exemplary embodiment the reformer tube is arranged vertically with the open tube end of the shell tube 3 in the upper position and is externally heated by means of burners (not shown in The FIGURE). During operation of the reformer tube the open tube end of the shell tube is sealed with a sealing apparatus 4, for example a flanged lid, which may be opened for overhauls and for charging and discharging of the catalyst.

After entry into the shell tube the natural gas and the reforming steam enter the dumped catalyst bed 5 which is formed from particles of a solid, nickel-based reforming catalyst. The input materials then flow upwards through the catalyst bed as indicated by flow arrows. The dumped catalyst bed is secured in the shell tube by means of the separating tray 6. Located between the separating tray and the dumped catalyst bed is a dumped bed of inert bodies 7 as a support for the catalyst.

The endothermic steam reforming reaction takes place over the reforming catalyst. After leaving the dumped catalyst bed, the partially converted natural gas which comprises not only carbon oxides and hydrogen but also unconverted methane enters an open space 8 arranged at the sealed tube end 4 of the shell tube. The partially converted input gas stream subsequently enters the entry end of the coiled heat exchanger tubes 9 arranged inside the dumped catalyst bed. The gas stream flowing through the heat exchanger tubes 9 gives up in countercurrent a portion of its sensible heat to the dumped catalyst bed and the input gas stream flowing through said bed. The heat exchanger tubes are made of materials having good resistance against metal dusting corrosion, for example Alloy 601, 602 CA, 617, 690, 692, 693, HR 160, HR 214, copper-containing alloys or so-called multilayer materials where the tubes are coated with tin-nickel or aluminium-nickel alloys. In addition or alternatively, the exit ends of the heat exchanger tubes are provided on their insides, and the portions fed through the separating tray on the outsides as well, with a corrosion protection layer. In the present example this is an aluminium diffusion layer.

After flowing through the heat exchanger tubes the synthesis gas product stream enters the exit chamber B. To this purpose the exit ends of both heat exchanger tubes 9 are fed through the separating tray 6 and thus secured. They then open with their exit ends into the inner tube 10 which provides the connection between the heat exchanger tubes 9 and the collection conduit 11. The inner tube is likewise fabricated from one of the abovementioned metallic materials of construction and its inner wall and preferably also its outer wall are provided with an aluminium diffusion layer as a corrosion protection layer. Alternatively it is also possible to use an inner tube made from a ceramic material.

The inner tube 10 is secured in its position between the underside of the separating tray 6 and the collection conduit 11 by means of fastenings which are not depicted. There is no fixed, gastight connection between inner tube and the underside of the separating tray; instead, the inner tube is at a distance from the latter or is seated merely end to end on the underside of the separating tray. In this way it is possible for compensation and/or transfer of the static pressure to take place through the gas-permeable thermal insulation layer 12 onto the inner wall of the shell tube 3. The contact of the inner wall of the shell tube with the resting or only gently flowing synthesis gas product is not critical, since the surface temperature of the wall, owing to insulation, is below the temperature range that is relevant for metal dusting corrosion. Since, therefore, the inner tube is not pressurized, it may also be made from less pressure-resistant materials, such as ceramic materials, for example.

Mounted between the outer wall of the inner tube and the inner wall of the shell tube is a gas-permeable insulating material 12. For this purpose it is possible to use fibre-based insulating materials, but also ceramic mouldings with inherent dimensional stability. Such mouldings are particularly advantageous because they are particularly easy to mount and demount. On account of their dimensional stability, they can easily be inserted, during mounting, into the annular space between shell tube and inner tube, without any requirement for special fixing means.

On the exit side as well, the inner tube 10 is not fixedly or not gastightly connected to the collection conduit 11, but is instead merely guided or plugged into said conduit. Besides the advantages discussed above, the inner tube can easily be replaced in this way in the event of plant overhaul. Furthermore, compressive tensile stresses are avoided, or which otherwise may occur in the operation of the reformer tube, owing to differences in thermal expansion coefficients of the materials used for shell tube and inner tube.

The collection conduit 11 is provided on its inside with insulating material 13 and/or a corrosion-resistant, for example ceramic, coating 14, which have increased resistance towards metal dusting corrosion. The synthesis gas product stream is discharged from the reformer tube 1 via the collection conduit and is sent for further processing. Depending on the intended use of the synthesis gas product, this processing may comprise a carbon monoxide conversion, a gas scrubbing operation for removal of carbon dioxide, a pressure swing adsorption for hydrogen removal, and further processing stages.

INDUSTRIAL APPLICABILITY

The invention proposes a reformer tube enabling internal heat exchange between the input gas and the product gas partially converted into synthesis gas products, thus giving rise to advantages in terms of energy consumption during use of the reformer tube. The inventive embodiment of the reformer tube in particular in the region of the exit chamber makes it possible to effectively counteract metal dusting corrosion.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS
[1] Reformer tube
[2] Entry conduit
[3] Shell tube
[4] Sealing apparatus
[5] Dumped catalyst bed
[6] Separating tray
[7] Dumped bed of inert bodies
[8] Open space
[9] Heat exchanger tubes
[10] Inner tube
[11] Collection conduit
[12] Insulation layer
[13] Insulation layer
[14] Coating
[A] Reaction chamber
[B] Exit chamber
[C] Collection conduit

The invention claimed is:

1. A reformer tube for converting hydrocarbon-containing input material into a synthesis gas product comprising carbon oxides and hydrogen under steam reforming conditions, comprising
   a. an outer, pressurized shell tube, wherein the outer, pressurized shell tube is divided into a reaction chamber and an exit chamber by means of a separating tray, so that it is possible to set a different pressure in the exit chamber than in the reaction chamber, and wherein the reaction chamber is externally heated,
   b. a dumped bed of a steam-reforming-active solid catalyst arranged in the reaction chamber,
   c. an entry for an input gas stream comprising the hydrocarbon-containing input material, arranged in the reaction chamber, wherein the entry for the input gas stream is in fluid connection with the dumped catalyst bed,
   d. at least one helically coiled heat exchanger tube arranged inside the reaction chamber and inside the dumped catalyst bed, whose entry end is in fluid connection with the dumped catalyst bed and whose exit end is in fluid connection with the exit chamber, wherein the input gas stream after entry into the reaction chamber initially flows through the dumped catalyst bed and subsequently flows through the heat exchanger tube in countercurrent, and wherein the heat exchanger tube is in a heat exchange relationship with the dumped catalyst bed and the input gas stream flowing therethrough,
   e. a collection conduit for the synthesis gas product, which is in fluid connection with the exit chamber, wherein, in the exit chamber:
   the exit end of the heat exchanger tube is fed through the separating tray and opens into an inner tube which is arranged in the interior of the shell tube and is in fluid connection with the collection conduit, so that the synthesis gas product is able to pass from the reaction chamber via the exit chamber into the collection conduit,
   the inner tube is equipped with a corrosion protection layer or consists of a corrosion-resistant material, and
   a gas-permeable thermal insulation layer is disposed between the inner wall of the shell tube and the outer wall of the inner tube.

2. The reformer tube according to claim 1, wherein the exit end of the heat exchanger tube is furnished on its inside, and the portion fed through the separating tray on its outside as well, with a corrosion protection layer.

3. The reformer tube according to claim 1, wherein the inner tube is seated on the separating tray but is not in gastight communication therewith.

4. The reformer tube according to claim 1, wherein the heat exchanger tube is helically coiled.

5. A reformer furnace comprising refractorily lined or refractorily faced walls, a ceiling and a floor and an interior formed thereby, wherein the reformer furnace further comprises at least one reformer tube according to claim 1 and at least one burner for heating the reformer tube are arranged in the interior or in a secondary space in fluid connection with the interior in respect of burner flue gases.

6. The reformer furnace according to claim 5, wherein the at least one reformer tube is arranged in the interior in hanging or standing fashion, wherein the portion of the shell tube comprising the reaction chamber is arranged in the interior and the portion of the shell tube comprising the exit chamber is at least partially fed through the ceiling or the floor.

7. The reformer furnace according to claim 5, wherein a multiplicity of reformer tubes and burners are arranged in the interior, and in that the longitudinal axes of flames generated by the burners are oriented parallel to the longitudinal axes of the reformer tubes.

8. A process for producing synthesis gas by catalytic steam reforming of hydrocarbon-containing input material under steam reforming conditions in the presence of a steam-reforming-active solid catalyst, the process comprising the steps of:
   a. providing an input gas stream comprising the hydrocarbon-containing input material and addition of reforming steam;
   b. catalytically converting the input material under steam reforming conditions into a synthesis gas product comprising carbon oxides and hydrogen;
   c. discharging the synthesis gas product;
   wherein the catalytic conversion in step (b) is effected in the reformer tube according to claim 1.

9. The process according to claim 8, wherein a pressure in the exit chamber is lower than in the reaction chamber.

\* \* \* \* \*